United States Patent

Hanyu et al.

Patent Number: 6,147,766
Date of Patent: Nov. 14, 2000

[54] PRINTING APPARATUS FOR INCREASING EFFICIENCY IN TRANSMITTING IMAGE DATA BETWEEN INTERNAL CONTROL UNITS

[75] Inventors: Yoshiaki Hanyu; Tetsuro Hirota; Tatsuhiko Oikawa, all of Kanagawa, Japan

[73] Assignee: Ricoh Company, Ltd., Tokyo, Japan

[21] Appl. No.: 09/020,280

[22] Filed: Feb. 6, 1998

[30] Foreign Application Priority Data

Feb. 12, 1997 [JP] Japan ................................... 9-027492

[51] Int. Cl.[7] ........................................................ G06F 15/00
[52] U.S. Cl. ........................ 358/1.17; 358/1.13; 358/1.15; 347/37
[58] Field of Search ..................................... 395/110, 111, 395/112, 114, 115, 116; 358/296, 435, 436, 1.11, 1.12, 1.13, 1.15, 1.16, 1.17; 347/37

[56] References Cited

U.S. PATENT DOCUMENTS

| | | | |
|---|---|---|---|
| 4,789,874 | 12/1988 | Majette et al. ........................... | 347/37 |
| 5,150,455 | 9/1992 | Morikawa .............................. | 395/114 |
| 5,440,410 | 8/1995 | Sugishima ............................. | 358/502 |
| 5,754,750 | 5/1998 | Butterfield et al. ................... | 395/116 |

*Primary Examiner*—Edward L. Coles
*Assistant Examiner*—Mark Wallerson
*Attorney, Agent, or Firm*—Cooper & Dunham LLP

[57] ABSTRACT

In a printing apparatus, a printer control unit transmits image data to an engine control unit for a respective one of a plurality of bands sent by a host computer. The image data of the respective one of the plurality of bands defines a pattern of "M" dots by "N" lines related to an image of a corresponding band where both "M" and "N" denote an integer. The printer control unit transmits a band information command to the engine control unit prior to the transmission of the image data. The band information command includes a band height, a print start dot position and a print end dot position, the band height indicative of a quantity of the image data transmitted, the print start dot position indicative of a position of a print start dot with respect to all the "N" lines in the image, and the print end dot position indicative of a position of a print end dot with respect to all the "N" lines in the image.

10 Claims, 8 Drawing Sheets

FIG. 9A  VCLK(1)
FIG. 9B  /CBR(0)
FIG. 9C  /EBR(1)
FIG. 9D  CDATA(0) MDATA(0) YDATA(0) KDATA(0)

PRINTING APPARATUS FOR INCREASING EFFICIENCY IN TRANSMITTING IMAGE DATA BETWEEN INTERNAL CONTROL UNITS

BACKGROUND OF THE INVENTION (1.) Field of the Invention

The present invention relates to a printing apparatus, and more particularly to a printing apparatus in which image data is transmitted from a printer control unit to an engine control unit in units of bands.

(2.) Description of the Related Art

Generally, an existing printing apparatus, such as an ink-jet printer or a laser beam printer, receives print data sent by a host computer, converts the print data into image data, and transmits the image data to a printing control unit. The printing control unit controls scanning of a printing head based on the received image data so that the printing head prints an image of the image data.

In order to transmit print data from the host computer to the printing apparatus, several printer interfaces are commonly used. The printer interfaces fall into two broad categories. In one of the broad categories, raster and other processing of an image to be printed are performed by the host computer, and the print data as a result of the raster processing is transmitted. In the other broad category, print data and a print command are transmitted to the printing apparatus by the host computer, and raster and other processing of the print data are performed by the printing apparatus in response to the print command.

For example, Centronics interface belongs to the former category. In a case of Centronics interface, the host computer creates image data by performing raster processing of an image using a printer driver provided in the host computer. The image data is transmitted to the printing apparatus by the host computer through the Centronics interface. The raster and other processing of an image to be printed are performed by the host computer, and it is not necessary for the printing apparatus to have a high-performance microcomputer. The printer interface of this category is effective in providing a low-cost printing apparatus.

However, in the case of the former category, the speed of printing by the printing apparatus depends on the speed of processing by the host computer, and it takes a long time to transmit the image from the host computer to the printing apparatus even if a high-performance microcomputer is contained in the host computer. The printer interface of this category provides the printing apparatus with a relatively low printing speed.

In a case of the latter category, the print data and the print command are transmitted to the printing apparatus by the host computer. It takes little time to transmit the print data from the host computer to the printing apparatus. The printer interface of this category is effective in providing a printing apparatus having a relatively high printing speed.

However, in the case of the latter category, it is necessary that the printing apparatus be provided with a page buffer in which the print data sent by the host computer is stored. In the printing apparatus, the raster and other processing of the stored print data must be performed in response to the print command. In order to carry this out, it is necessary that the printing apparatus be constructed by a high-performance microcomputer and a page buffer having a large capacity of storage.

In recent developments, a display-list method has been proposed as a new method of transmitting print data from the host computer to the printing apparatus. According to the display-list method, a unit data of the print data transmitted by the host computer to the printing apparatus is defined as a band. In the host computer, print data is divided into a plurality of bands, and a print command is generated for a respective one of the plurality of bands of the print data. A respective one of the plurality of bands and a related print command generated therefor are transmitted to the printing apparatus by the host computer. In the printing apparatus, the raster and other processing of the received image data are performed in response to the print command with respect to each of the plurality of bands.

If a printing apparatus were to be suitably adapted to the display-list method mentioned above, the printing apparatus would provide a higher speed of transmission of image data than the speed of transmission of image data in the case of the conventional Centronics interface. Further, if a printing apparatus could take full advantage of the display-list method, it would not be necessary that the printing apparatus be provided with a page buffer having a large capacity of storage as in the case of the conventional command-based printer interface. The use of the display-list method would be more effective in providing a low-cost printing apparatus than the use of the conventional command-based printer interface.

However, the existing printing apparatus is not suitably adapted to the display-list method. It is difficult for the existing printing apparatus to efficiently process the image data sent by the host computer in units of bands in accordance with the display-list method.

SUMMARY OF THE INVENTION

An object of the present invention is to provide an improved printing apparatus in which the above-described problems are eliminated.

Another object of the present invention is to provide a printing apparatus which provides an increased efficiency in transmitting image data from a host computer to a printer engine in a case in which the host computer transmits image data to the printing apparatus in units of bands, in order to allow a low-cost printing apparatus having an increased speed of the transmission of image data to be provided.

The above-mentioned objects of the present invention are achieved by a printing apparatus comprising: a printer engine which prints an image on a sheet of paper; a printer control unit which receives print data and a print command, both sent by a host computer, the print data corresponding to one of a plurality of bands, the printer control unit converting the print data into image data in response to the print command; and an engine control unit which controls the printer engine based on a control command sent by the printer control unit, so that the printer engine performs the printing of an image of the image data, wherein the printer control unit transmits the image data to the engine control unit for a respective one of the plurality of bands sent by the host computer, the image data of the respective one of the plurality of bands defining a pattern of "M" dots by "N" lines related to an image of a corresponding band, where both "M" and "N" denote an integer, and wherein the printer control unit transmits a band information command to the engine control unit prior to the transmission of the image data, the band information command including a band height, a print start dot position and a print end dot position, the band height indicative of a quantity of the image data transmitted, the print start dot position indicative of a position of a print start dot with respect to all the "N" lines in the image of the corresponding band, and the print end dot position indicative of a position of a print end dot with respect to all the "N" lines in the image of the corresponding band.

The printing apparatus of the present invention can provide a higher speed of transmission of image data than the speed of transmission of image data in the case of the conventional Centronics interface. In addition, it is not necessary that the printing apparatus be provided with a page buffer having a large capacity of storage as in the case of the conventional command-based printer interface. The printing apparatus of the present invention is effective in providing a low-cost printing apparatus having an increased speed of the transmission of image data.

BRIEF DESCRIPTION OF THE DRAWINGS

Other objects, features and advantages of the present invention will become more apparent from the following detailed description when read in conjunction with the accompanying drawings in which.

DETAILED DESCRIPTION OF THE PREFERRED EMBODIMENT

A description will now be given of the preferred embodiment of the present invention with reference to the accompanying drawings.

Figure 1:
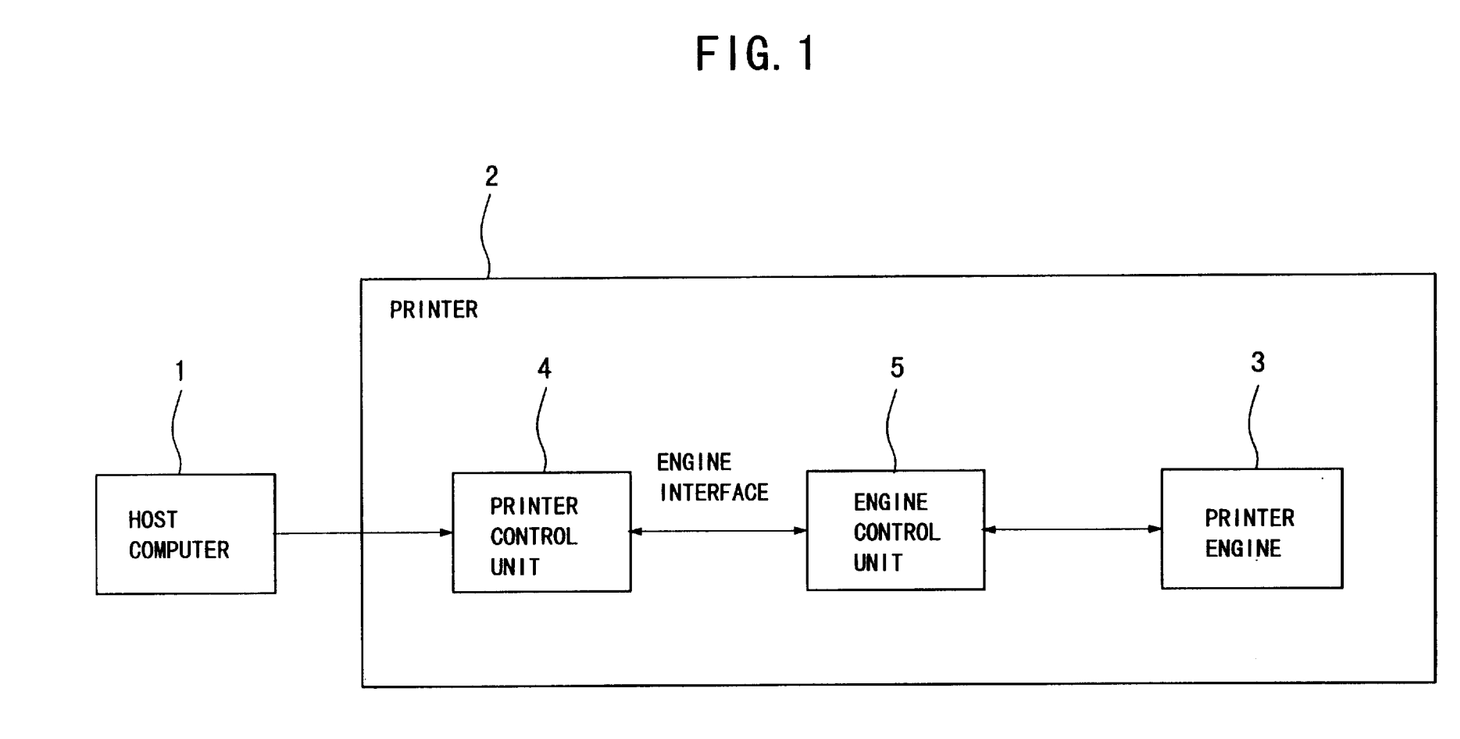
FIG. 1 is a block diagram of a printer system including an ink-jet printing apparatus to which one embodiment of the present invention is applied.

FIG. 1 shows a printer system including an ink-jet printing apparatus to which one embodiment of a printing apparatus of the present invention is applied.

The printer system, as shown in FIG. 1, comprises a host computer 1 and an ink-jet printing apparatus 2 (which will be called a printer 2). The host computer 1 comprises peripheral devices (not shown) connected thereto, such as an external storage device and an image reading device.

As shown in FIG. 1, the printer 2 generally has a printer engine 3, a printer control unit 4, and an engine control unit 5. The printer engine 3 comprises a printing head which prints an image on a sheet of paper, and a scanning mechanism which performs main-scanning and sub-scanning of the printing head to the sheet. The printer control unit 4 receives print data (or one of a plurality of bands in the print data) and a print command which are sent by the host computer 1, converts the print data into image data (which will be called video data) in response to the print command, and transmits the video data and a control command to the engine control unit 5. The engine control unit 5 controls the printer engine 3 based on the control command sent by the printer control unit 4, so that the printer engine 3 performs the printing of an image of the video data. In the printer 2, signal lines 6 which interconnect the printer control unit 4 and the engine control unit 5 are provided. The signal lines 6 provided between the printer control unit 4 and the engine control unit 5 are called an engine interface 6.

Figure 2:
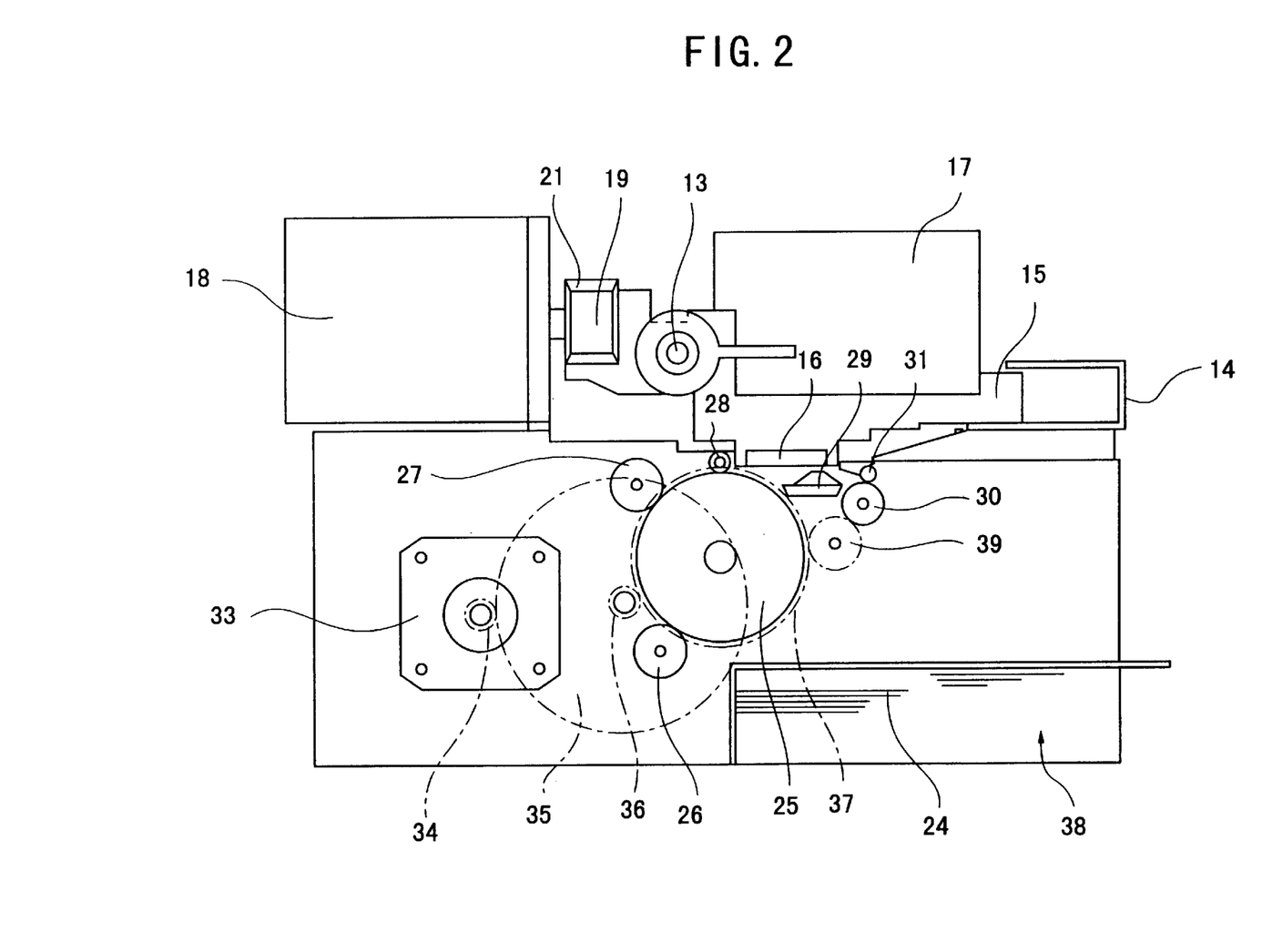
FIG. 2 is a cross-sectional view of a printer engine in the printing apparatus of FIG. 1.
Figure 3:
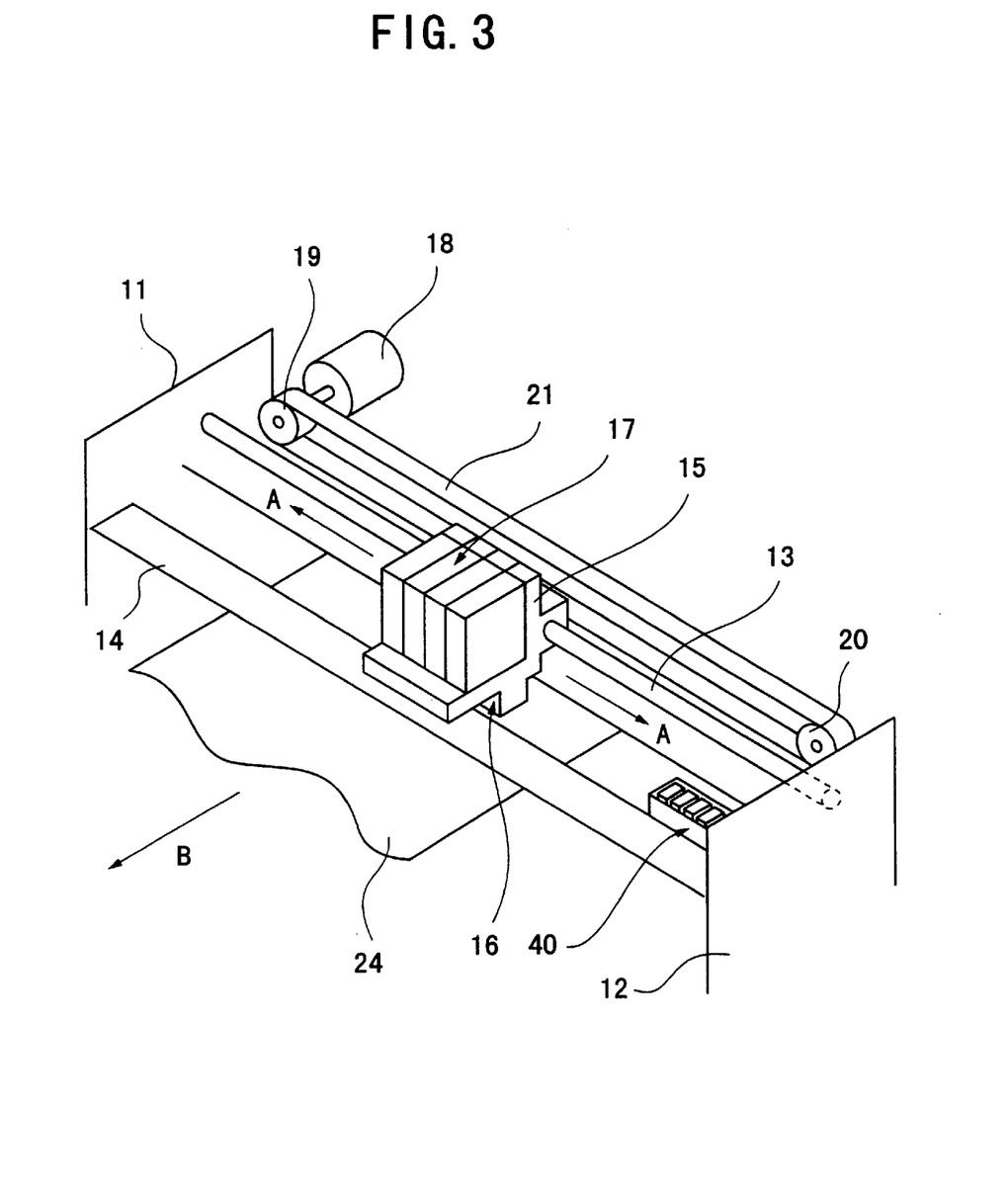
FIG. 3 is a perspective view of a main portion of the printer engine.

FIG. 2 shows a construction of the printer engine 3 in the printer 2 according to the present invention. FIG. 3 shows a main portion of the printer engine 3.

As shown in FIG. 3, the printer engine 3 includes a pair of side panels 11 and 12. A guide rod 13 and a guide rail 14, both extending transversely between the side panels 11 and 12, are provided. A carriage 15 is movably supported on the guide rod 13 and on the guide rail 14. The carriage 15 is movable in a main scanning direction, indicated by the arrow "A" in FIG. 3, along the guide rod 13 (or along the guide rail 14). A printing head 16 is provided on a bottom side of the carriage 15. The printing head 16 in this embodiment has a plurality of ink-jet heads, and ink nozzles of the ink-jet heads in the printing head 16 face downward. An ink cartridge 17 is provided on a top side of the carriage 15. The ink cartridge 17 supplies ink to the printing head 16.

Specifically, the printing head 16 in the present embodiment has four ink-jet heads: a yellow (Y) ink head; a magenta (M) ink head; a cyan (C) ink head; and a black (K) ink head. The ink cartridge 17 in the present embodiment includes four ink cartridges: a Y ink cartridge; an M ink cartridge; a C ink cartridge; and a K ink cartridge, and the four color (Y, M, C and K) inks from the ink cartridges are respectively supplied to the ink-jet heads of the printing head 16.

The printing head 16 in the present embodiment is a multi-nozzle ink-jet head having a plurality of ink nozzles, and the ink-jet heads of the multi-nozzle ink-jet head individually discharge a related one of the four color inks from the plurality of ink nozzles. Alternatively, a single ink-jet head having a plurality of ink nozzles for discharging the four color inks may be used instead of the multi-nozzle ink-jet head.

The printing head 16 in the present embodiment includes a plurality of electro-mechanical elements, such as piezo-electric elements, in order to generate energy to discharge ink. Alternatively, a plurality of electrothermic elements, such as thermal-resistance elements, may be used instead of the electro-mechanical elements.

The carriage 15 (or the printing head 16 provided thereon) is moved in the main scanning direction "A" by a main-scan motor 18. The main-scan motor 18 includes a stepping motor. A driving pulley 19, a driven pulley 20, and a timing belt 21 between the driving pulley 19 and the driven pulley 20 are provided. The carriage 15 is connected to the timing belt 21, and the carriage 15 is moved in accordance with a movement of the timing belt 21. The driving pulley 19 is rotated by the main-scan motor 18, and the timing belt 21 is moved by the rotation of the driving pulley 19. Therefore, the carriage 15 (or the printing head 16) is moved in the main scanning direction "A" by the rotation of the main-scan motor 18 through the connection between the timing belt 21 and the carriage 15.

In the printer engine 3, a platen roller 25 is provided, and rotation of the platen roller 25 causes a sheet of paper (which will be called a sheet 24) to be transported in a sub-scanning direction, indicated by the arrow "B" in FIG. 3. Since the sheet 24 is moved relative to the printing head 16 in the sub-scanning direction "B", a sub-scanning of the printing head 16 to the sheet 24 is carried out by the rotation of the platen roller 25. When the printing is performed by the printer engine 3, a main scanning of the printing head 16 to the sheet 24 is carried out by the rotation of the main-scan motor 18 at the same time as the sub-scanning of the printing head 16.

Paper input rollers 26 and 27 are provided on the periphery of the platen roller 25, and the paper input rollers 26 and 27 are pressed onto the platen roller 25 so as to transport the sheet 24. A pinch roller 28 is provided on the top of the platen roller 25 so as to define an angle to transport the sheet 24 from the platen roller 25. A guide plate 29 confronting the platen roller 25 is provided so as to guide the sheet 24 when it is transported to and passed by the printing head 16. A paper output roller 30 is provided at an output-side portion of the printing head 16, and rotation of the paper output roller 30 causes the sheet 24 to be transported to an output tray (not shown) outside the printer 2. A contact roller 31 is provided on the periphery of the paper output roller 30, and the contact roller 31 is pressed onto the paper output roller 30 so as to transport the sheet 24.

In the printer engine 3, a sub-scan motor 33 is provided so as to rotate the platen roller 25. The sub-scan motor 33 includes a stepping motor. The sub-scan motor 33 has a rotating shaft, and a gear 34 is provided on the rotating shaft of the sub-scan motor 33. A gear 35 is engaged with the gear 34 on the rotating shaft of the sub-scan motor 33, and a gear 36 is provided coaxially with a rotating shaft of the gear 35. A platen gear 37 is provided on a rotating shaft of the platen roller 25, and the platen gear 37 is engaged with the gear 36. Thus, rotation of the sub-scan motor 33 is transmitted to the platen roller 25 through the gears 34–37, and the platen roller 25 is rotated by the rotation of the sub-scan motor 33.

Since the sub-scan motor 33 rotates the platen roller 25, the sheet 24, contained in an input tray 38, is transported by the platen roller 25 such that a leading edge of the sheet 24 is delivered from the input tray 38 to the printing head 16 via the paper input rollers 26 and 27 and the pinch roller 28. After the leading edge of the sheet 24 is placed beneath the printing head 16, the sheet 24 is delivered a given distance in the sub-scanning direction "B" by the platen roller 25. Since the paper output roller 30 is engaged with the platen gear 37 via a gear 39, the paper output roller 30 and the contact roller 31 are rotated by the platen roller 25. The sheet 24 is delivered in the sub-scanning direction "B" to the output tray by the paper output roller 30.

In the printer 2 of the above-described embodiment, the ink nozzles of the printing head 16 discharge ink to the sheet 24 while the main scanning of the printing head 16 (or the movement of the carriage 15) and the sub-scanning of the printing head 16 (or the movement of the sheet 24) with respect to the sheet 24 are performed. By performing the above procedure, the printer 2 prints a color image on the sheet 24.

In the printer 2 of the above-described embodiment, the input tray 38 is a single-stage input tray, for the sake of illustration. Alternatively, a multi-stage input tray having a plurality of stages provided therein may be used instead of the input tray 38. Further, a multiple-stage output tray may be used as an output tray of the printer 2.

Further, in the printer 2 of the present embodiment, as shown in FIG. 3, a sub-system 40 is provided below the printing head 16 at a right-side end portion within a main-scanning range of the carriage 15. This portion is located adjacent to the side panel 12. The sub-system 40 cleans the nozzle surfaces and nozzles of the printing head 16 to remove dirt or dust thereon. This operation of the sub-system 40 is controlled by the engine control unit 5 when the printer engine 3 is placed in a standby condition, when the printer control unit 4 does not receive the print data from the host computer 1 over a given time period, or at intervals of a predetermined period. The sub-system 40 maintains and recovers a reliability of the printing head 16 in the printer 2.

Figure 4:
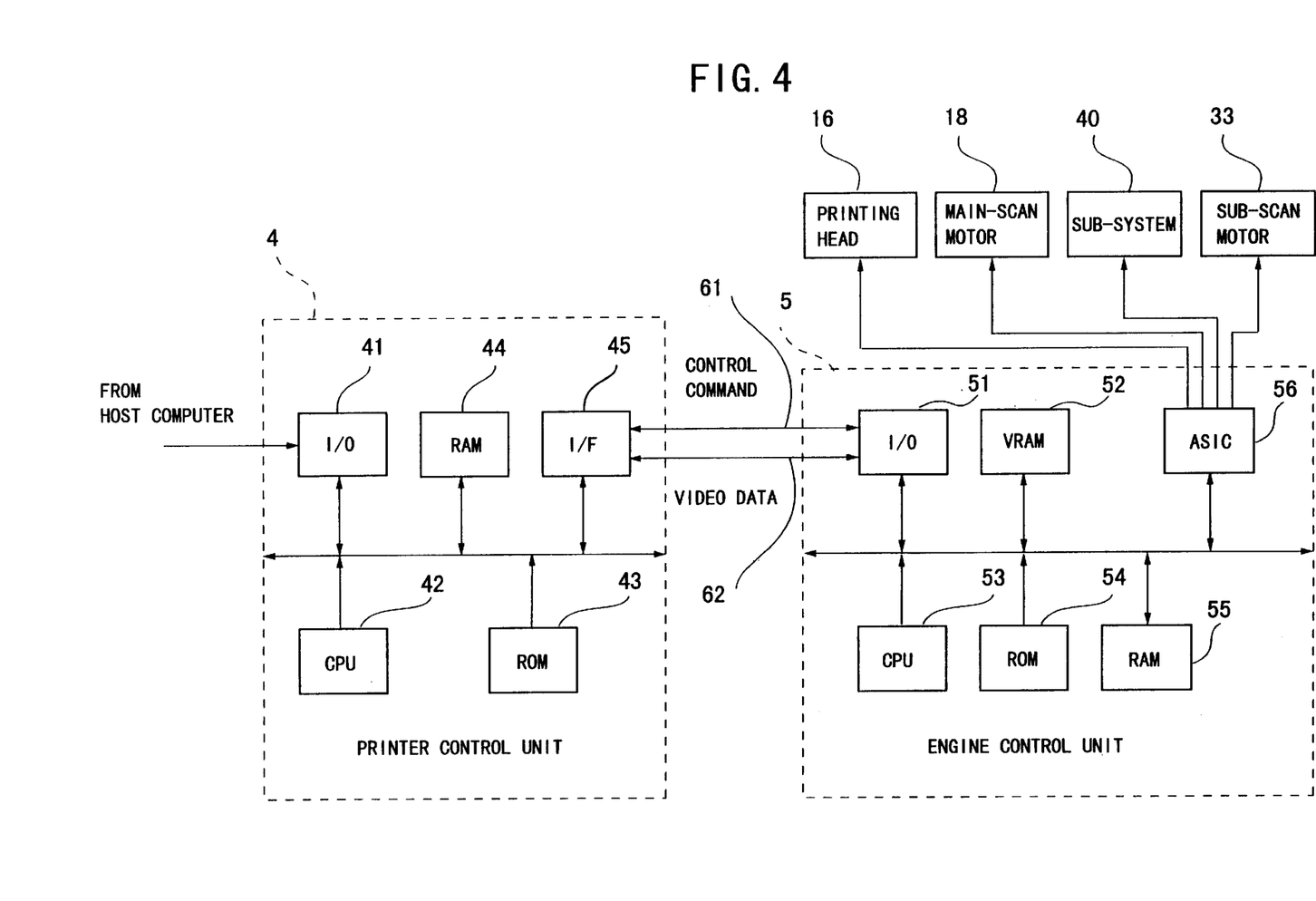
FIG. 4 is a block diagram of a printer control unit and an engine control unit in the printing apparatus.

FIG. 4 shows the printer control unit 4 and the engine control unit 5 in the printer 2.

As shown in FIG. 4, the printer control unit 4 generally has an input/output (I/O) interface 41, a central processing unit (CPU) 42, a read-only memory (ROM) 43, a random access memory (RAM) 44, and an interface (I/F) 45. The I/O interface 41 is used to receive the print data (or one of the plurality of bands in the print data) and the print command which are sent by the host computer 1. The CPU 42 converts the print data into the video data in response to the print command, and transmits the video data and/or the control command to the engine control unit 5. The ROM 43 provides storage areas for control instructions of a program executed by the CPU 42 in order to carry out the data conversion and the data/command transmission procedures as mentioned above. The RAM 44 provides working storage areas used by the CPU 42. Specifically, in the working storage areas of the RAM 44 of the printer control unit 4, the video data, derived from the print data (or one of the plurality of bands) by the CPU 42, is expanded and temporarily stored. The I/F 45 provides the printer control unit with an interface with the engine control unit 5.

As shown in FIG. 4, the engine control unit 5 generally has an input/output (I/O) interface 51, a video random access memory (VRAM) 52, a central processing unit (CPU) 53, a read-only memory (ROM) 54, a random access memory (RAM) 55, and an application-specific integrated circuit (ASIC) 56. The I/O interface 51 is used to receive the video data and/or the control command which are sent by the printer control unit 4. The VRAM 52 provides working storage areas for the received video data. The CPU 53 expands and stores the received video data in the working storage areas of the VRAM 52 and controls the printer engine 3 based on the received control command. The ROM 54 provides storage areas for control instructions of a program executed by the CPU 53 in order to carry out the video data storing and the printer engine controlling procedures as mentioned above. The RAM 55 provides working storage areas used by the CPU 53. The ASIC 56 provides the engine control unit 5 with various interfaces with the printing head 16, the main-scan motor 18, the sub-scan motor 33 and the sub-system 40 in the printer engine 3.

Further, the engine interface 6 provided between the printer control unit 4 and the engine control unit 5, as shown in FIG. 4, includes a command line 61 and a video data line 62. The command line 61 is a serial transmission line through which the control command from the printer control unit 4 is transmitted to the engine control unit 5. The video data line 62 is a bidirectional transmission line through which the video data from the printer control unit 4 is transmitted to the engine control unit 5. Signals provided on the video data line 62 between the printer control unit 4 and the engine control unit 5 will be described later.

Next, a description will be given of an operation of the printer 2 to which one embodiment of the present invention is applied, with reference to FIG. 5 through FIG. 8.

In the printer 2 of the present embodiment, various kinds of the control commands are transmitted to the engine control unit 5 by the printer control unit 4 in order to control the printer engine 3, as follows:

- a print start command which is sent to place the printer engine 3 in a standby condition to start the printing of an image of the video data by the printing head 16;
- a set print quality command which is sent to instruct the engine control unit 5 to designate a print quality of the printer engine 3;
- a set paper command which is sent to instruct the engine control unit 5 to designate a kind of the sheet 24 to the printer engine 3;
- a set color command which is sent to instruct the engine control unit 5 to designate one of a monochrome printing and a color printing to the printer engine 3;
- a set paper size command which is sent to instruct the engine control unit 5 to designate a size of the sheet 24 of the input tray 38 to the printer engine 3;
- a set input tray command which is sent to instruct the engine control unit 5 to designate a type of the input tray 38 to the printer engine 3;
- a set output tray command which is sent to instruct the engine control unit 5 to designate a type of the output tray to the printer engine 3;
- a band information command which is sent to notify the engine control unit 5 of the information related to the video data being transmitted; and
- a paper out command which is sent to instruct the engine control unit 5 to cause the sheet 24 to be transported to the output tray.

Figure 5:
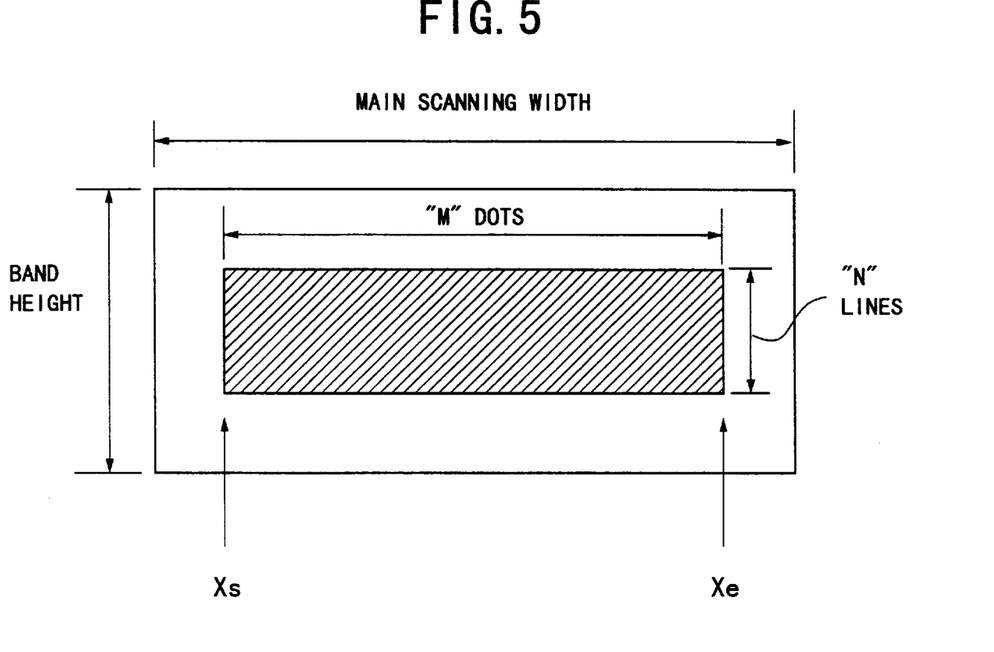
FIG. 5 is a diagram for explaining a band information command.

The above-listed band information command will now be described with reference to FIG. 5.

In the printer 2, the printer control unit 4 transmits the video data to the engine control unit 5 for a respective one of the plurality of bands sent by the host computer 1. The video data prior to the transmission is derived from one of the plurality of bands (or the print data) sent by the host computer 1, and the video data is stored in the RAM 44. The video data (corresponding to one of the plurality of bands) defines a pattern of "M" dots by "N" lines related to an image of a corresponding band, where both "M" and "N" denote an integer. The printer control unit 4 transmits the band information command to the engine control unit 5 prior to the transmission of the video data.

The band information command contains information related to the video data (or the corresponding band) which is subsequently transmitted to the engine control unit 5. Specifically, the band information command comprises a "band height", a print start dot position "xs", and a print end dot position "xe". As shown in FIG. 5, a main scanning width of an image to be printed is given by a predetermined constant length, and the band height in the band information command is indicative of a quantity of the video data being transmitted. Further, a position of a print start dot and a position of a print end dot with respect to all the "N" lines in the image of the video data are indicated by "xs" and "xe" in the band information command. The engine control unit 5 acquires these parameters from the band information command when the band information command from the printer control unit 4 is received.

Figure 6:
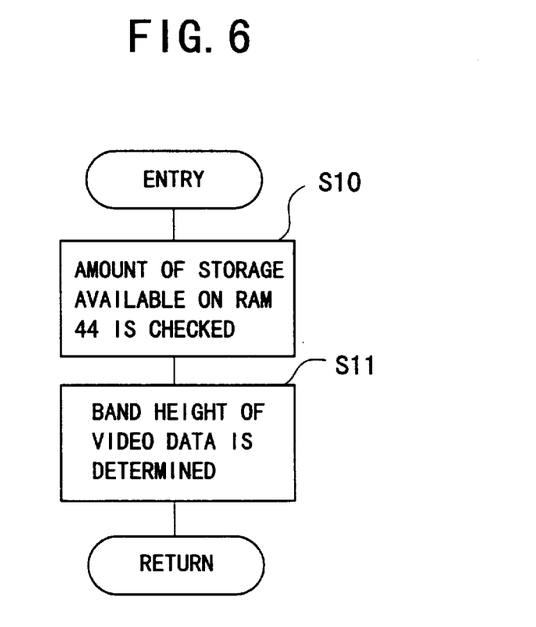
FIG. 6 is a flowchart for explaining a band height determination procedure executed by the printer control unit.

Next, FIG. 6 shows a band height determination procedure executed by the printer control unit 4 before transmitting the band information command.

As shown in FIG. 6, when the print command from the host computer 1 is received, the CPU 42 of the printer control unit 4 in step S10 checks, in response to the print command, that an amount of storage available on the RAM 44 is greater than a quantity of video data (or a corresponding band) derived from the print data sent by the host computer 1. When the amount of storage available on the RAM 44 is detected to be greater than the quantity of the video data, the working storage areas of the RAM 44 are assigned to expand the video data therein.

After the amount of the storage available on the RAM 44 is checked in the step S10, the CPU 42 in step S11 determines a "band height" of the video data (or the corresponding band) based on the quantity of the video data actually stored in the RAM 44. Further, the CPU 42 in step S11 determines a print start dot position "xs" and a print end dot position "xe" based on the quantity of the video data actually stored in the RAM 44.

The band height, the position "xs" and the position "xe", determined in the step S11, are set in the band information command, and the band information command is subsequently transmitted to the engine control unit 5.

Figure 7:
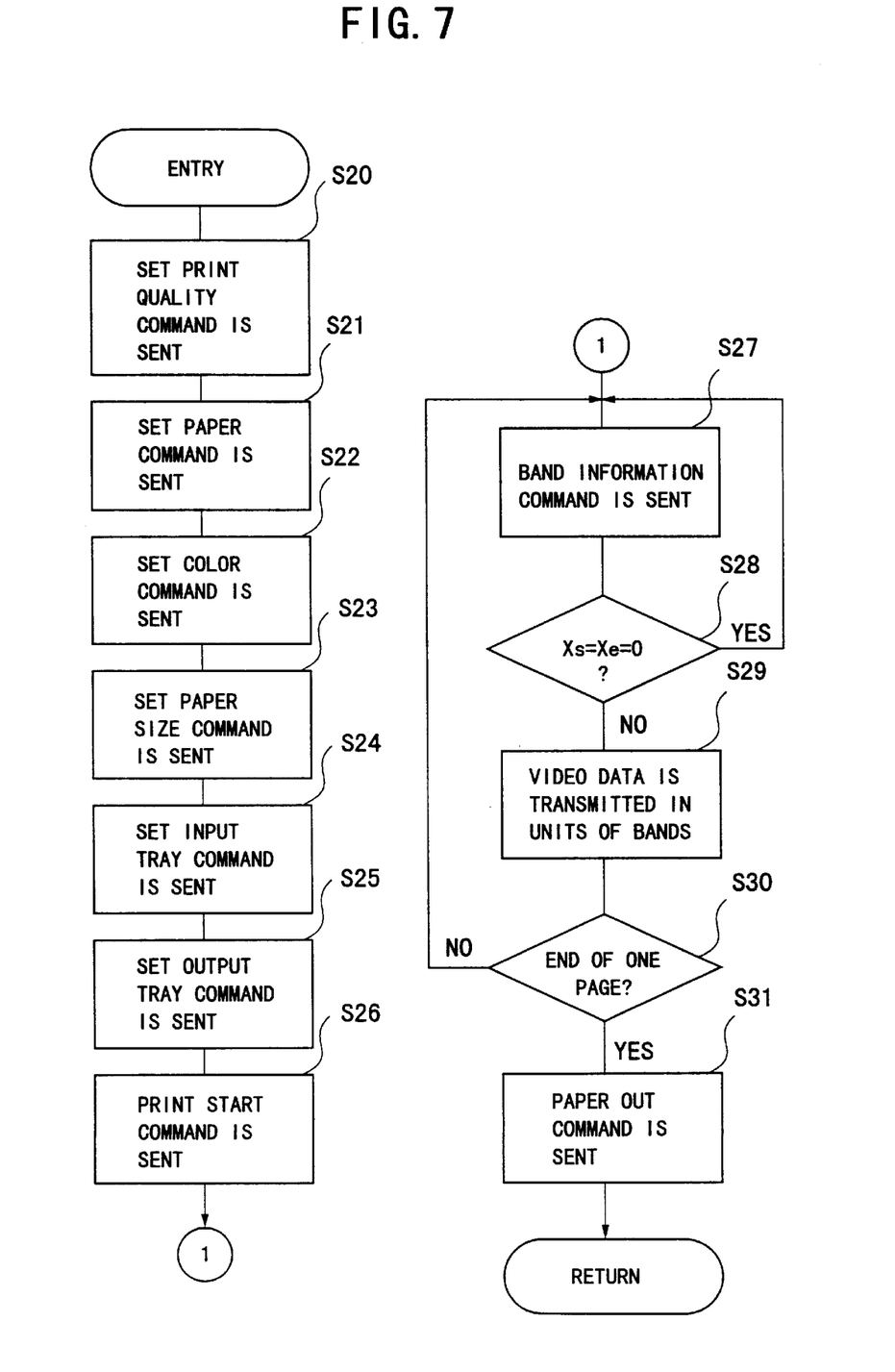
FIG. 7 is a flowchart for explaining a command and video data transmission procedure executed by the printer control unit.

FIG. 7 shows a command and video data transmission procedure executed by the printer control unit 4.

As described above, the printer control unit 4 receives the print data (or the corresponding band) and the print command which are sent by the host computer 1 in units of bands in accordance with the display-list method. The printer control unit 4 converts the print data into the video data in response to the print command and expands the video data in the working storage area of the RAM 44 for a respective one of the plurality of bands sent by the host computer 1. The command and video data transmission procedure of FIG. 7 is executed by the CPU 42 when the printer control unit 4 is controlled under such conditions.

As shown in FIG. 7, the CPU 42 of the printer control unit 4 in steps S20 through S25 sequentially transmits the set print quality command (step S20), the set paper command (step S21), the set color command (step S22), the set paper size command (step S23), the set input tray command (step S24), and the set output tray command (step S25), in this order, to the engine control unit 5. In the engine control unit 5, print conditions, under which the printer engine 3 performs the printing of an image of the video data, are determined in response to these control commands sent by the printer control unit 4, which will be described later.

After the steps S20 through S25 are performed, the CPU 42 in step S26 transmits the print start command to the engine control unit 4 so as to place the printer engine 3 in the standby condition to start the printing of an image of the video data by the printing head 16.

After the step S26 is performed, the CPU 42 in step S27 transmits the band information command related to the video data, to the engine control unit 5 prior to the transmission of the video data.

After the step S27 is performed, the CPU 42 in step S28 determines whether both the print start dot position "xs" and the print end dot position "xe" in the band information command are equal to a predetermined value (or zero).

When the result of the step S28 is affirmative ("xs"="xe"=0), it is determined that no video data is subsequently transmitted from the printer control unit 4 to the engine control unit 5. Control is returned to the step S27 without transmitting the video data. In this case, the CPU 42 in the step S27 transmits a next band information command related to next video data, to the engine control unit 5. If the result of the step S28 is negative, the CPU 42 in the step S29 transmits the next video data to the engine control unit as described above.

When the result of the step S28 is negative, the CPU 42 in step S29 transmits the video data to the engine control unit 5 for a respective one of the plurality of bands sent by the host computer 1. After the step S29 is performed, the CPU 42 in step S30 determines whether the transmission of all the video data for one page in the image is finished by the transmission of the video data in the step S29.

When the result of the step S30 is negative (all the video data for one page in the image is not yet transmitted), control is returned to the step S27. In this case, the CPU 42 in the step S27 transmits a next band information command to the engine control unit 5. If the result of the step S28 is negative, the CPU 42 in the step S29 transmits next video data to the engine control unit 5.

When the result of the step S30 is affirmative (the transmission of all the video data for one page is finished), the CPU 42 in step S31 transmits the paper out command to the engine control unit 5 so as to cause the sheet 24 to be transported to the output tray of the engine control unit 5. After the step S31 is performed, the command and video data transmission procedure of FIG. 7 by the printer control unit 4 ends.

Further, while receiving the print data and the print command sent from the host computer 1, the printer control unit 4 converts the print data into the video data in response to the print command and expands the video data in the working storage areas of the RAM 44 for a respective one of the plurality of bands sent by the host computer 1. The execution of the command and video data transmission procedure of FIG. 7 is repeated by the CPU 42 until the transmission of all the video data for the whole image is finished.

Figure 8:
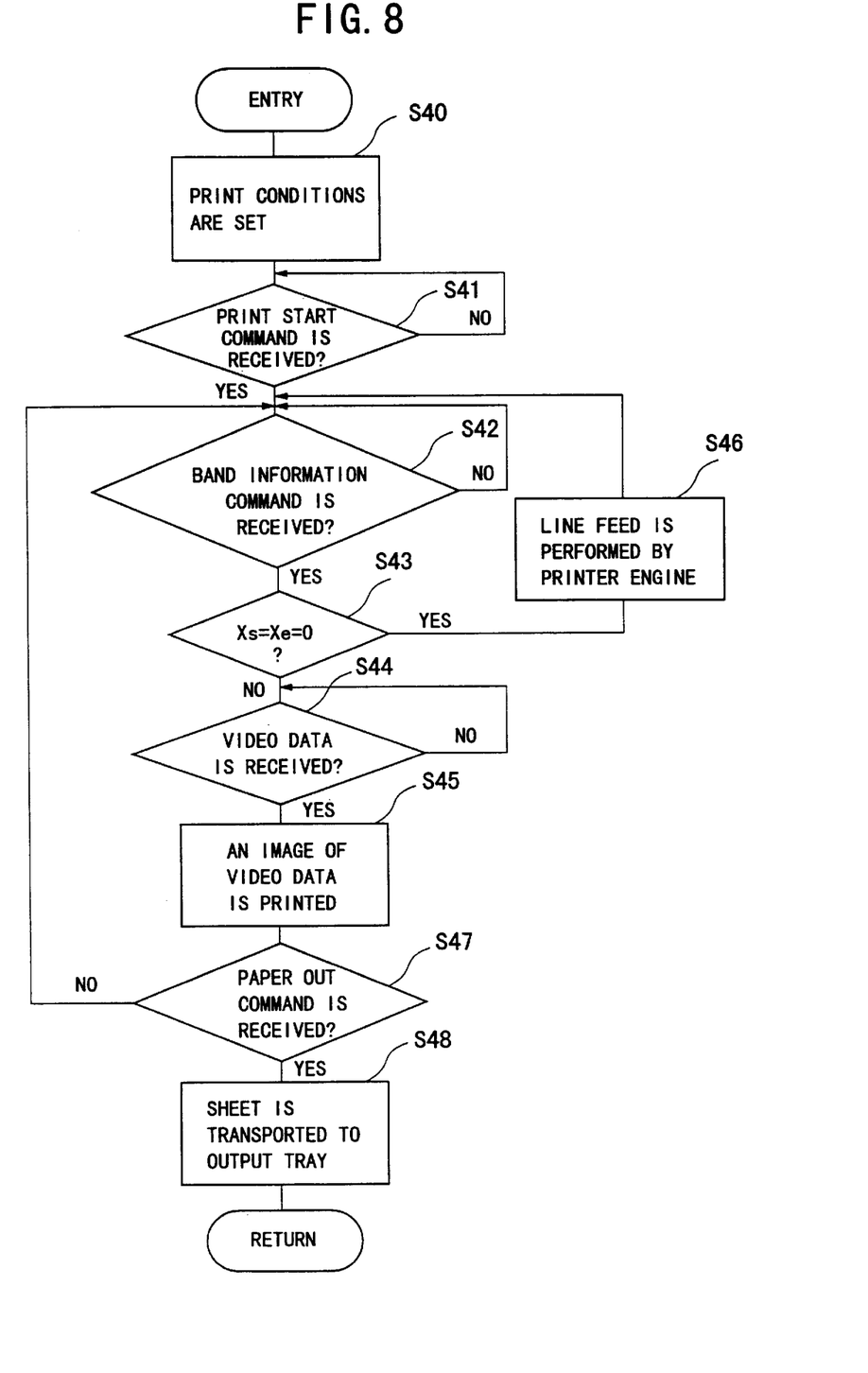
FIG. 8 is a flowchart for explaining a printing procedure executed by the engine control unit.

FIG. 8 shows a printing procedure executed by the engine control unit 5 while the command and video data transmission procedure of FIG. 7 is executed by the printer control unit 4.

As shown in FIG. 8, the CPU 53 of the engine control unit 5 in step S40 determines print conditions of the printer engine 3 in response to the control commands sent by the printer control unit 4 in the steps S20–S25 of the procedure of FIG. 7. Under the printing conditions determined in the step S40, the printing of an image of the video data is performed by the printer engine 3.

After the step S40 is performed, the CPU 53 in step S41 determines whether the print start command sent by the printer control unit 4 (the step S26) is received. The CPU 53 does not proceed to a next step until the print start command is received. When the print start command is received, the CPU 53 places the printer engine 3 in the standby condition to start the printing of an image of the video data.

After the step S41 is performed, the CPU 53 in step S42 determines whether the band information command sent by the printer control unit 4 (the step S27) is received. The CPU 53 does not proceed to a next step until the band information command is received. When the band information command is received, the CPU 53 detects, based on the received band information command, the band height, the print start dot position "xs" and the print end dot position "xe", related to the video data subsequently transmitted to the engine control unit 5.

After the step S42 is performed, the CPU 53 in step S43 determines whether both the print start dot position "xs" and the print end dot position "xe" in the received band information command are equal to the predetermined value (or zero).

When the result of the step S43 is affirmative ("xs"="xe"=0), it is determined that no video data is subsequently transmitted from the printer control unit 4 to the engine control unit 5. In this case, the printing of an image of the video data is not performed by the printing head 16. The CPU 53 in step S46 controls the printer engine 3 such that the printer engine 3 performs a line feed in the sub-scanning direction "B" by a distance proportional to the band height in the received band information command. After the step S46 is performed, control is returned to the step S42 and the performance of the step S42 is repeated. In this case, the CPU 53 awaits receiving a next band information command from the printer control unit 4.

When the result of the step S43 is negative, the CPU 53 in step S44 determines whether the video data transmitted by the printer control unit 4 (the step S29) for a respective one of the plurality of bands sent by the host computer 1 is received. The CPU 53 does not proceed to a next step until the video data from the printer control unit 4 is received. When the video data (or the corresponding band) from the printer control unit 4 is received, the CPU 53 in step S45 expands and stores the received video data in the working storage areas of the VRAM 52, and performs the printing of an image of the video data (or the corresponding band) on the sheet 24 by controlling the printing head 16.

After the step S45 is performed, the CPU in step S47 determines whether the paper out command sent by the printer control unit 4 (the step S31) is received. When the result of the step S47 is negative (the paper out command is not yet received), control is returned to the step S42 so that the performance of the band information command receiving and image printing (the steps S42–S45) for each of the plurality of bands in the print data is repeated by the engine control unit 5 until the paper out command is received.

When the result of the step S47 is affirmative (the paper out command from the printer control unit 4 is received), the CPU 53 in step S48 causes the sheet 24 to be transmitted to the output tray by controlling the printer engine 3. After the step S48 is performed, the printing procedure of FIG. 8 by the engine control unit 5 ends.

When the printing procedure of FIG. 8 is executed by the engine control unit 5, the engine control unit 5 controls the printer engine 3 such that the carriage 15 is moved in both the right and left main scanning directions "A" as shown in FIG. 3. Further, the engine control unit 5 controls the printer engine 3 so as to minimize the total distance of the movements of the carriage 15. That is, after the printing head 16 has reached the print end dot position of one line during the movement of the carriage 15 in the right main scanning direction, the carriage 15 is subsequently moved in the left main scanning direction "A", and, after the printing head 16 has reached the print start dot position of another line during the movement of the carriage 15 in the left main scanning direction "A", the carriage 15 is subsequently moved in the right main scanning direction "A". Thus, the total distance of the movements of the carriage 15 is minimized.

Further, as described above, when the transmission of all the video data for one page is finished, the printer control unit 4 transmits the paper out command to the engine control unit 5. Upon receipt of the paper out command, the engine control unit 5 causes the sheet 24 to be transported to the output tray of the printer engine 3. In this manner, the execution of the printing procedure of FIG. 8 is repeated by the CPU 53 of the engine control unit 5 until the transmission of all the video data for the whole image is finished, or until the transmission of the print command from the host computer 1 to the printer control unit 4 is finished.

In the above-described embodiment, the printer control unit 4 converts the print data into the video data and expands the video data in the working storage areas of the RAM 44 in units of bands each time the print data and the print command sent by the host computer 1 are received. The video data stored in the RAM 44 is transmitted to the engine control unit 5, so that the printer engine 3 performs the printing of an image of the video data for a respective one of the plurality of bands sent by the host computer 1. Accordingly, the printing apparatus of the above-described embodiment can provide a higher speed of transmission of image data than the speed of transmission of image data in the case of the conventional Centronics interface. In addition, it is not necessary that the printer control unit 4 be provided with a page buffer having a large capacity of storage as in the case of the conventional command-based printer interface. The printing apparatus of the above-described embodiment is effective in providing a low-cost printing apparatus having an increased speed of the transmission of image data.

Next, FIG. 9A through FIG. 9D show signals provided between the printer control unit 4 and the engine control unit 5 when transmitting video data to the engine control unit 5.

Figures 9A, 9B, 9C, 9D:
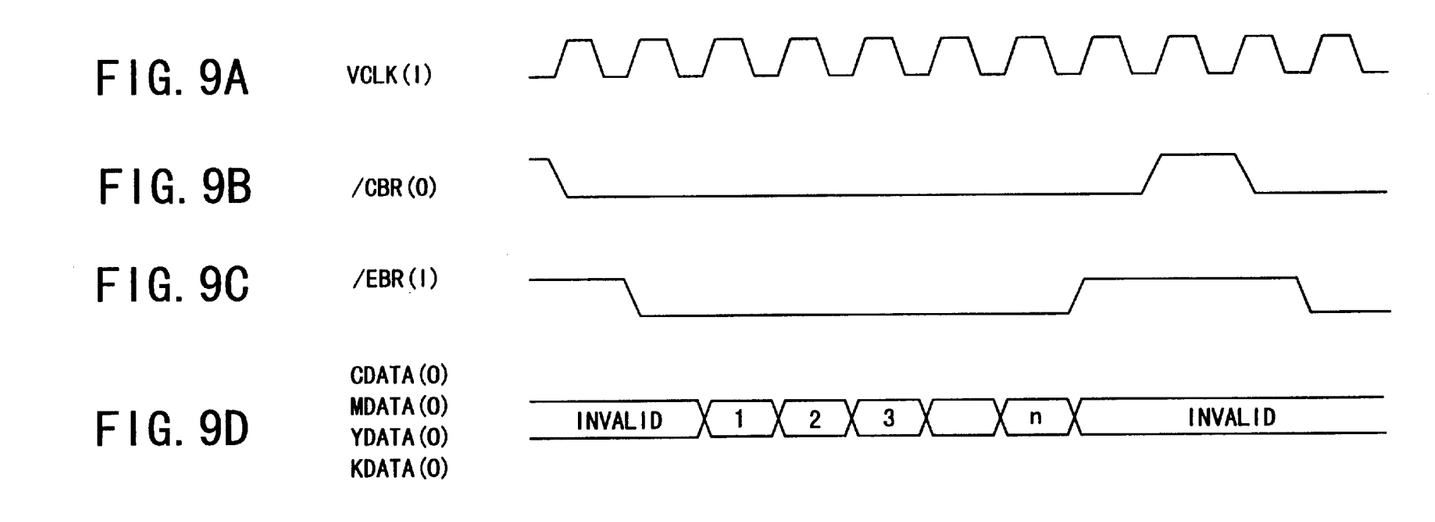
FIG. 9A through FIG. 9D are time charts for explaining signals provided between the printer control unit and the engine control unit when transmitting video data.

In the printing apparatus of the above-described embodiment, the following signals are provided on the video data line 62 between the printer control unit 4 and the engine control unit 5:

VCLK(1) which is a timing signal for synchronization of the video data, sent to the printer control unit 4 by the engine control unit 5;

/CBR(0) which is a confirmation signal asserted low by the printer control unit 4 when the printer control unit 4 is ready to transmit video data;

/EBR(1) which is a confirmation signal asserted low by the engine control unit 5 when the engine control unit 5 is ready to receive video data; and CDATA(0), MDATA(0), YDATA(0) and KDATA(0) which are video data signals for respective colors C, M, Y and K of an image being printed, where "(0)" at the end of the symbols of a related signal denotes that the signal is sent from the printer control unit 4 to the engine control unit 5, "(1)" at the end of the symbols of a related signal denotes that the signal is sent from the engine control unit 5 to the printer control unit 4, and "/" at the beginning of the symbols of a related signal denotes that the signal is active low.

As shown in FIG. 9A and FIG. 9B, when the printer control unit 4 is ready to transmit video data, the printer control unit 4 asserts low the confirmation signal /CBR(0) in synchronism with the rising edge of the timing signal VCLK(1). The engine control unit 5 detects this change of the confirmation signal /CBR(0).

As shown in FIG. 9C, the engine control unit 5 asserts low the confirmation signal /EBR(1) in synchronism with the rising edge of the timing signal VCLK(1) if the engine control unit 5 is ready to receive video data after the detection of the active-low state of the confirmation signal /CBR(0).

As shown in FIG. 9D, the engine control unit 5 receives the video data signals CDATA(0), MDATA(0), YDATA(0) and KDATA(0) within a given clock period after the change of the confirmation signal /EBR(1) to the active-low state.

If the engine control unit 5 is not ready to receive video data immediately after the detection of the active-low state of the confirmation signal /CBR(0) (for example, during the operation of the sub-system 40), the engine control unit 5 delays the asserting of the confirmation signal /EBR(1). In this case, the printer control unit 4 is placed in a waiting condition until the engine control unit 5 becomes ready to receive video data.

As shown in FIG. 9C, when the video data signals for a number of picture elements included in one line of the image are received, the engine control unit 5 negates the confirmation signal /EBR(1) in synchronism with the rising edge of the timing signal VCLK (1). As shown in FIG. 9B, the printer control unit 4 negates the confirmation signal /CBR (0) in synchronism with the rising edge of the timing signal VCLK(1) after the detection of the inactive-high state of the confirmation signal /EBR(1). In this manner, the transmission of video data for one line of the image between the printer control unit 4 and the engine control unit 5 is performed.

In the above-described embodiment, the timing signal VCLK(1), the confirmation signal /CBR(0), and the confirmation signal /EBR(1) are provided between the printer control unit 4 and the engine control unit 5 when transmitting the video data to the engine control unit 5. Therefore, in the printing apparatus of the present embodiment, the transmission of video data from the printer control unit 4 to the engine control unit 5 can be stopped or restarted for each of lines of the image.

The above-described embodiment is applied to the ink-jet printing apparatus in which the video data from the printer control unit 4 is transmitted to the engine control unit 5. However, the present invention is not limited to the above-described embodiment, and it may be also applied to a different-type printing apparatus.

Further, the present invention is not limited to the above-described embodiment, and variations and modifications may be made without departing from the scope of the present invention.

What is claimed is:

1. A printing apparatus comprising:

a printer engine for printing an image on a sheet of paper;

a printer control unit for receiving print data and a print command, both sent by a host computer, the print data corresponding to one of a plurality of bands, said printer control unit converting the print data into image data in response to the print command; and an engine control unit for controlling the printer engine based on a control command sent by the printer control unit, so that the printer engine performs the printing of an image of the image data, wherein said printer control unit transmits the image data to the engine control unit for a respective one of the plurality of bands sent by the host computer, said image data of the respective one of the plurality of bands defining a pattern of "M" dots by "N" lines related to an image of a corresponding band, where both "M" and "N" denote an integer, and wherein said printer control unit transmits a band information command to the engine control unit prior to the transmission of the image data, said band information command including a band height, a print start dot position and a print end dot position, said band height indicative of a quantity of the image data transmitted, said print start dot position indicative of a position of a print start dot with respect to all the "N" lines in the image, and said print end dot position indicative of position of a print end dot with respect to all the "N" lines in the image, and wherein, when both the print start dot position and the print end dot position in a received band information command are equal to a predetermined value, said engine control unit controls the printer engine such that the printer engine performs a line feed by a distance proportional to the band height in the received band information command without performing the printing of the image.

2. The printing apparatus according to claim 3, wherein said printer control unit comprises a memory for storing the image data derived from the print data for the respective one of the plurality of bands, and wherein said printer control unit determines a band height based on a quantity of the image data stored in the memory.

3. The printing apparatus according to claim 3, wherein said printer control unit transmits the image data to the engine control unit for the respective one of the plurality of bands when the print start dot position or the print end dot position in the band information command of a corresponding band is not equal to the predetermined value.

4. The printing apparatus according to claim 3, wherein, when the print start dot position or the print end dot position in a received band information command is not equal to the predetermined value, said engine control unit controls the printer engine such that the printer engine performs the printing of an image of the image data for the respective one of the plurality of bands.

5. The printing apparatus according to claim 3, wherein said printer control unit comprises a memory for storing the image data derived from the print data for the respective one of the plurality of bands, and wherein, when the print command sent by the host computer is received, said printer control unit determines whether an amount of storage available on the memory is greater than a quantity of the image data derived.

6. The printing apparatus according to claim 5, wherein, when it is determined that the amount of storage available on the memory is greater than the quantity of the image data derived, said printer control unit assigns working storage areas provided by the memory to expand the image data therein.

7. A printing apparatus comprising:
   a printer engine for printing an image on a sheet of paper;
   a printer control unit for receiving print data and a print command, both sent by a host computer, the print data corresponding to one of a plurality of bands, said printer control unit converting the print data into image data in response to the print command;
   an engine control unit for controlling the printer engine based on a control command sent by the printer control unit, so that the printer engine performs the printing of an image of the image data; and
   a data line provided between the printer control unit and the engine control unit, wherein a first signal and a second signal are provided on said data line when the image data is transmitted from the printer control unit to the engine control unit,
   wherein said printer control unit transmits the image data to the engine control unit for a respective one of the plurality of bands sent by the host computer, said image data of the respective one of the plurality of bands defining a pattern of "M" dots by "N" lines related to an image of a corresponding band, where both "M" and "N" denote an integer,
   wherein said printer control unit transmits a band information command to the engine control unit prior to the transmission of the image data, said band information command including a band height, a print start dot position and a print end dot position, said band height indicative of a quantity of the image data transmitted, said print start dot position indicative of a position of a print start dot with respect to all the "N" lines in the image, and said print end dot position indicative of position of a print end dot with respect to all the "N" lines in the image,
   wherein said printer control unit does not transmit the image data to the engine control unit when both the print start dot position and the print end dot position in the band information command are equal to a predetermined value,
   wherein, when the printer control unit is ready to transmit the image data, the printer control unit asserts the first signal on the data line, and the engine control unit detects an active level of the first signal, and
   wherein, when the engine control unit is ready to receive the image data after the active level of the first signal is detected, the engine control unit asserts the second signal on the data line, and the printer control unit detects an active level of the second signal prior to the transmission of the image data.

8. A printing apparatus comprising:
   a printer engine for printing an image on a sheet of paper;
   a printer control unit for receiving print data and a print command, both sent by a host computer, the print data corresponding to one of a plurality of bands, said printer control unit converting the print data into image data in response to the print command;
   an engine control unit for controlling the printer engine based on a control command sent by the printer control unit, so that the printer engine performs the printing of an image of the image data; and
   a data line provided between the printer control unit and the engine control unit and the engine control unit, wherein a first signal and a second signal are provided on said data line when the image data is transmitted from the printer control unit to the engine control unit,
   wherein said printer control unit transmits the image data to the engine control unit for a respective one of the plurality of bands sent by the host computer, said image data of the respective one of the plurality of bands defining a pattern of "M" dots by "N" lines related to an image of a corresponding band, where both "M" and "N" denote an integer,
   wherein said printer control unit transmits a band information command to the engine control unit prior to the transmission of the image data, said band information command including a band height, a print start dot position and a print end dot position, said band height indicative of a quantity of the image data transmitted, said print start dot position indicative of a position of a print start dot with respect to all the "N" lines in the image, and said print end dot position indicative of position of a print end dot with respect to all the "N" lines in the image,
   wherein said printer control unit does not transmit the image data to the engine control unit when both the print start dot position and the print end dot position in the band information command are equal to a predetermined value, and
   wherein, when image data for a number of picture elements included in one of the "N" lines of the image is received by the engine control unit, the engine control unit negates the second signal on the data line, and, after the printer control unit detects an inactive level of the second signal negated by the engine control unit, the printer control unit negates the first signal.

9. A printing apparatus comprising:

printer engine means for printing an image on a sheet of paper;

printer control means for receiving print data and a print command, both sent by a host computer, the print data corresponding to one of a plurality of bands, said printer control means converting the print data into image data in response to the print command; and engine control means for controlling the printer engine based on a control command sent by the printer control means, so that the printer engine means performs the printing of an image of the image data, wherein said printer control means transmits the image data to the engine control means for a respective one of the plurality of bands sent by the host computer, said image data of the respective one of the plurality of bands defining a pattern of "M" dots by "N" lines related to an image of a corresponding band, where both "M" and "N" denote an integer, and wherein said printer control means transmits a band information command to the engine control means prior to the transmission of the image data, said band information command including a band height, a print start dot position and a print end dot position, said band height indicative of a quantity of the image data transmitted, said print start dot position indicative of a position of a print start dot with respect to all the "N" lines in the image, and said print end dot position indicative of position of a print end dot with respect to all the "N" lines in the image, and wherein, when both the print start dot position and the print end dot position in a received band information command are equal to a predetermined value, said engine control means controls the printer engine means such that the printer engine means performs a line feed by a distance proportional to the band height in the received band information command without performing the printing of the image.

10. A printing method comprising:

a printer engine step for printing an image on a sheet of paper; a printer control step for receiving print data and a print command, both sent by a host computer, the print data corresponding to one of a plurality of bands, said printer control step converting the print data into image data in response to the print command; and an engine control step for controlling the printer engine step based on a control command sent by the printer control step, so that the printer engine step performs the printing of an image of the image data, wherein said printer control step transmits the image data to the engine control step for a respective one of the plurality of bands sent by the host computer, said image data of the respective one of the plurality of bands defining a pattern of "M" dots by "N" lines related to an image of a corresponding band, where both "M" and "N" denote an integer, and wherein said printer control step transmits a band information command to the engine control step prior to the transmission of the image data, said band information command including a band height, a print start dot position and a print end dot position, said band height indicative of a quantity of the image data transmitted, said print start dot position indicative of a position of a print start dot with respect to all the "N" lines in the image, and said print end dot position indicative of position of a print end dot with respect to all the "N" lines in the image, and wherein, when both the print start dot position and the print end dot position in a received band information command are equal to a predetermined value, said engine control step controls the printer engine step such that the printer engine step performs a line feed by a distance proportional to the band height in the received band information command without performing the printing of the image.

* * * * *